United States Patent [19]

Duque-Anton et al.

[11] Patent Number: 5,475,868
[45] Date of Patent: Dec. 12, 1995

[54] CELLULAR RADIO SYSTEM HAVING CHANNEL EVALUATION AND OPTIMAL CHANNEL SELECTION VIA TRIAL USE OF NON-ASSIGNED CHANNELS

[75] Inventors: Jesus M. Duque-Anton; Dietmar W. Kunz; Bernhard J. Rüber, all of Nürnberg, Germany

[73] Assignee: U.S. Philips Corporation, New York, N.Y.

[21] Appl. No.: 101,159

[22] Filed: Aug. 3, 1993

[30] Foreign Application Priority Data

Aug. 4, 1992 [DE] Germany .......................... 42 25 688.7
Feb. 11, 1993 [DE] Germany .......................... 43 03 999.5

[51] Int. Cl.$^6$ ............................ H04B 17/00; H04Q 7/30
[52] U.S. Cl. ............................ 455/62; 455/33.1; 455/63; 455/67.1; 379/59
[58] Field of Search ............................ 455/33.1, 33.4, 455/34.1, 54.1, 56.1, 67.1, 67.3, 62, 63; 379/59, 58, 63; 370/95.1

[56] References Cited

U.S. PATENT DOCUMENTS

| | | | |
|---|---|---|---|
| 4,736,453 | 4/1988 | Schloemer | 455/67.3 |
| 4,747,101 | 5/1988 | Akaiwa et al. | 379/59 |
| 4,965,850 | 10/1990 | Schloemer | 455/67.3 |
| 5,023,900 | 6/1991 | Tayloe et al. | 379/59 |
| 5,095,500 | 3/1992 | Tayloe et al. | 379/59 |
| 5,123,112 | 6/1992 | Choate | 455/62 |
| 5,157,709 | 10/1992 | Ohteru | 379/58 |
| 5,280,630 | 1/1994 | Wang | 455/67.3 |

FOREIGN PATENT DOCUMENTS

| | | |
|---|---|---|
| 0431956 | 6/1991 | European Pat. Off. |
| 2234142 | 1/1991 | United Kingdom. |
| WO9010342 | 9/1990 | WIPO. |

OTHER PUBLICATIONS

B. J. T. Mallinder, "A Overview of the GSM System", DCRC, Oct. 12–14, 1988, pp. 1a/1–13.
W. P. Chapman et al, "Cellular Performance Evaluation Tools and Techniques", 36th IEEE Vehicular Technology Conference, 20–22 May, 1986, Dallas, Texas, pp. 279–284.

Primary Examiner—Edward F. Urban
Assistant Examiner—Mark D. Wisler
Attorney, Agent, or Firm—Michael J. Balconi-Lamica

[57] ABSTRACT

A mobile radio system includes fixed stations and mobile stations, a free channel for establishing connection to a mobile station being selected from a predetermined channel list for each fixed station. The individual station lists are initially assigned in a radio network planning phase. To adjust to changes in the system which only occur after it is in operation, the assignment of radio channels is modified on the basis of measured data obtained during actual operation of the system. In this way the system becomes self-adaptative.

8 Claims, 5 Drawing Sheets

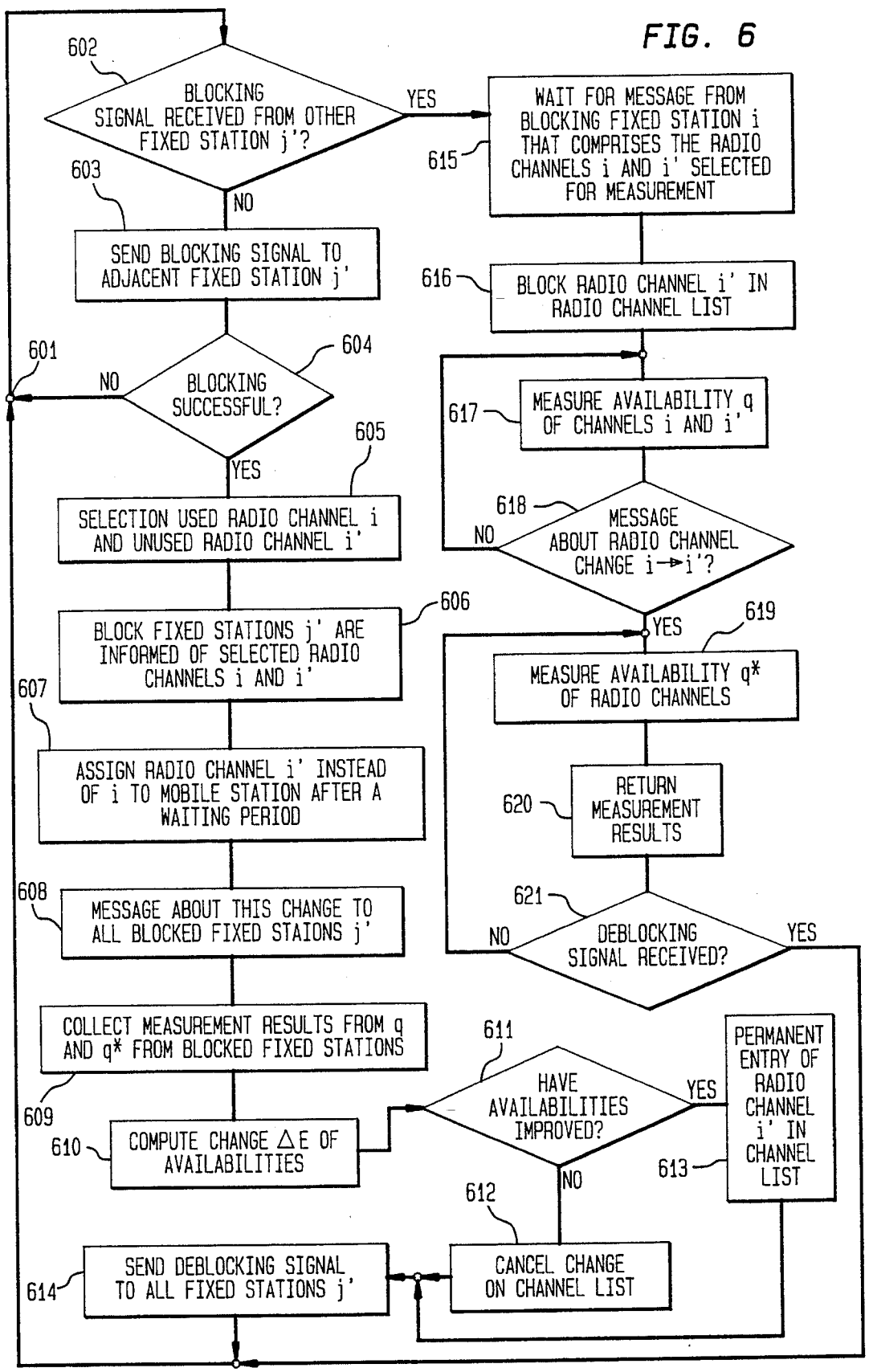

CELLULAR RADIO SYSTEM HAVING CHANNEL EVALUATION AND OPTIMAL CHANNEL SELECTION VIA TRIAL USE OF NON-ASSIGNED CHANNELS

BACKGROUND OF THE INVENTION

1. Field of the Invention

The invention relates to a mobile radio system comprising fixed stations and mobile stations, in which system an allocation of radio channels is assigned to each fixed station and, while the system is in the operating mode, the quality of the radio channel in use is measured.

The invention likewise relates to a fixed station and an evaluation means respectively, for such a radio system.

2. Description of the Related Art

Mobile radio systems for covering rather large coverage areas have been structured as cellular radio networks for a rather long time. Each cell of such a radio network comprises at least one fixed station which provides radio connection to the mobile stations located in its radio cell. Such a radio system is, for example, the Pan-European GSM system which is being established. A survey of the GSM system is found, for example, in "An Overview of the GSM System", Bernard J T. Mallinder, Conference Proceedings, Digital Cellular Radio Conference, Oct. 12–14, 1988, Hagen, Federal Republic of Germany, pages 1a/1–1a/13.

Based on a preceding radio network planning, a channel allocation plan was established in the GSM system, which makes an allocation of radio channels available as a radio channel list to each individual fixed station. In what is commonly referred to as Operations and Maintenance Centres (OMCs), the radio channel lists of the fixed stations allocated to the individual OMCs can be entered by means of a computer terminal by an operator. On the basis of the radio channel list thus assigned to each fixed station, a free radio channel is chosen to establish and maintain a radio connection.

To ensure undisturbed operation during a telephone connection, the GSM system further has the facility to move to another frequency within a cell (intracell handover) and also to move to another cell (intercell handover). To judge its radio situation, a mobile station continuously measures the signal strength of adjacent fixed stations and the signal strength as well as the bit error rate of the radio channel in use. These measured values are sent to the fixed station to which that radio channel is use. There is then decided on the basis of the received measured values whether a change of radio channel or a change of radio cell is necessary.

For making the frequency band which is available for the relevant radio system, accessible to a maximum number of users in the whole mobile radio system, great importance is attached to the radio network planning.

In the radio network planning each fixed station is assigned a limited allocation of radio channels from the total number of available radio channels. In adjacent radio cells mutually different radio channels are used, so that mutually interfering radio channels can be avoided. However due to the limited frequency band, the radio channels in the whole radio network, must to be re-used as often as possible to obtain maximum user capacity.

The number of channels necessary for a fixed station is determined by the size of the radio cell and the local traffic load to be expected. For example, more radio channels may be necessary in the coverage area of a large city than in an entirely rural area. Partly for this reason, there are already radio cells of variable size which make it possible in so-called small cells to re-use the sound radio channel at a rather small distance from the small cell when the transmitter power is diminished accordingly.

The distance these radio cells are to be kept apart to avoid radio interference depends on many factors. These factors are, for example, the transmitter power and the conditions of radio wave propagation caused by shadows, bends, scatterings, reflections and multipath propagation on the radio transmission path.

When radio cells are planned, topographical data (such as, differences in height, buildings and so on) are taken into consideration by means of statistical methods.

Published PCT application WO 90/10342 discloses a method of radio cell planning, according to which field strength and interference measurements are made in the planning phase with instrument cars especially made for this purpose, the results being stored in a data bank. To each radio cell are assigned a number of radio channels which correspond to the estimated traffic load to be expected. On the basis of the measurement results a what is commonly referred to as exclusion matrix is then computed, which reflects the interaction between the individual radio cells. Using an iterative assignment algorithm the radio channel assignment is effected in random order. If no complete channel assignment can be effected in this manner, a new attempt is made in any one of said steps.

Even if such a frequency planning is carried out very carefully, it cannot always be achieved that only on the basis of the planning, even if this planning is supported by measurements, there will be a really optimum frequency distribution in the radio network.

SUMMARY OF THE INVENTION

It is an object of the invention in a mobile radio system of the type described in the opening paragraph to achieve an optimum assignment of radio channels to the individual fixed stations.

This object is achieved in that in such a mobile radio system a change of the radio channel assignment is made by means of the measured data obtained in the operating mode of the mobile radio system.

For a radio connection between a fixed station and a mobile station in such a mobile radio system, a free radio channel is selected from the radio channels assigned to the fixed station. While there is such a radio connection, measurements are made from the mobile station or from the fixed station or from both stations, which measurements allow of an indication about the quality of the existing radio connection. Such measurements are, for example, the signal-to-noise ratio, the bit error rate, frame error rate and so on.

To simplify the storing of these measurement results, it is possible, for example, by comparing the results with a predeterminable threshold, to make a classification into "sufficient quality" and "insufficient quality" as early as at this stage.

The measured data are collected, for example, over a rather long period of time and evaluated at the end of such period of time. Preferably, a distribution of the radio channels is sought at for the channel lists to be made, such that the sum of the estimates of the qualities of the radio channels occurring in a channel list has maximum values in all of the of fixed stations.

When the channel lists are thus optimized, it is highly advantageous that the evaluated data on which there are based correspond to the actual network behaviour, because they were obtained while the system was in operation.

In this manner it is also possible to obtain a much greater number of measurement results than could previously be obtained with only trial measurements made to support the planning. The large number of measurement results make the measurement results also more reliable from a statistical point of view and they are produced free of cost if the cost of the installation is disregarded.

A reassignment of the radio channels after each evaluation of the measured data is thus always based on the latest operational situation. At the same time it is possible to detect the number of channels needed for a radio cell which appears from the total number of seized radio channels in conjunction with the observed blocking rate.

Such a radio system is advantageous in that it is capable of autonomously adjusting itself to changes in the network in response to the parameters detected over a rather long period of time, that is to say, the results collected over all the evaluation time intervals, and the current measured values.

This is especially advantageous for what is commonly referred to as microcells. To calculate field strength propagation and traffic densities, microcells need to have a degree of detail which makes a model-based precalculation for the radio network planning extremely expensive. For example, it has been proved that the shadowing properties of buildings can no longer be stochastically modelled as has been done so far. The adaptive strategy of the required mobile radio system has provided that when the mobile radio system is initially used, only a coarse frequency allocation needs to be effected for the individual microcells. A fine tuning of the allocations is then made automatically while the mobile radio system is in operation. Influences which are serious especially in microcells are, for example, buildings under construction which cause new shadowing properties to occur but also, as a result of the adaptive strategy of the frequency distribution in the individual microcells, changes of the traffic behaviour lead to an autonomous adjustment to such new conditions.

In this manner an increase of the traffic capacity of the whole network as well as an enhancement of its operational reliability is achieved. Since fixed station assignment and channel assignment are no longer based on unreliable planning data but on tested experiences, the number of calls lost is dropped and the quality of the call is enhanced.

Especially an estimate is suitable as a quality standard, which estimate indicates with what probability a specific radio channel will be available for the duration of a call; thus the probability that no change of radio channel will take place within a radio cell. For a computation of the estimate for the availability, for example, a functional combination of signal quality and signal strength is highly suitable. There is little availability especially if the signal quality is poor despite the high signal strength.

The use of an estimate for determining the availability pursues the object of minimization of the number of radio channel changes within a radio cell when a mobile radio system is optimized. Advantageously, this also results in an optimization of an adequate call quality for a maximum number of interlocutors.

In a further embodiment the state of occupancy of other radio channels is assigned to a detected quality of a radio channel. By evaluating these assignments there can be established whether there is a correlation between the use of radio channels in other radio cells and the measured quality of a radio channel. Radio channels for which there is no correlation do not mutually interfere and can therefore be included in the radio channel list of the fixed station concerned.

To detect the sates of occupancy of the radio channels at other fixed stations, there has to be a clam exchange between the fixed stations in the individual radio cells which exchange, for example, makes an inquiry concerning the channel occupancy possible. The result of this inquiry is then "channel X in radio cell Y occupied" or "channel X in radio cell Y not occupied".

Quality data and occupancy data are preferably collected in pairs for an evaluation. For an evaluation the probability that a radio channel has a sufficient quality is to be computed, for example, on the assumption that the same radio channel is occupied or not respectively, at another radio station.

To keep the circuitry and cost of computation within justifiable limits, one may be advised to evaluate only the state of occupancy of immediately adjacent channels or, in the extreme case, only the occupancy of channels having the same frequency.

For an evaluation of so-called cumulative interferences it is advantageous to include the quality of a radio channel in dependence on the occupancy of the radio channels in various other radio cells. Such cumulative interferences, caused by the fact that a radio channel is not yet disturbed when one radio channel is occupied, but only in the event of simultaneous occupancy of two other radio channels, could thus far not be included in the planning of mobile radio systems with the known methods.

Data on radio channel quality and occupancy can be collected, for example, in repetitive time intervals. For this purpose, there may be time intervals of equal duration depending on the traffic load of the radio cells, for example, of the order of days or weeks, but also statistically distributed time intervals. Statistically distributed time intervals are especially suitable for time-dependent optimization operations to minimize mutual influences in the radio network.

In a further embodiment the channel quality is only enquired when a new channel at a radio station is seized. Thereto, for example, a fixed station which has just seized a radio channel can ask all the adjacent fixed stations whether the new occupancy of the channel has changed the quality of the other channels of the adjacent fixed stations.

Another embodiment provides an enquiry into the state of occupancy always if the quality of a channel at a fixed station has changed significantly. Once a fixed station has noticed a significant deterioration of the quality of a radio channel, all the adjacent radio stations are asked whether they have just changed their channel occupancy.

The latter two embodiments are advantageous in that the number of data to be evaluated can be reduced considerably in this manner, because in contrast to a data inquiry taking place in regular repetitive periods of time, data are in this case asked and exchanged only with each change of the radio network.

In a special embodiment of the invention a fixed station, instead of using one of its assigned radio channels, uses a radio channel that is not assigned thereto and the consequent changes of radio channel quality taking place at this fixed station and at adjacent fixed stations are evaluated so that, when the qualities improve, the radio channel used by way of trial is substituted for the assigned channel.

As a result of the trial use of an unused channel, the effects perceived in the radio network can be directly attributed to the use of this channel, which considerably simplifies the evaluation for a reorganisation of the channel lists.

As long as it has been ascertained that a simultaneous trial use of radio channels is restricted to regional coverage areas of the radio networks, which channels will not likely influence each other, the reorganizations of the channel lists may thus be effected independently in regionally bounded areas of the radio network. This provides that in an advantageous manner it is possible to react per region to regionally occurring changes of the radio situation.

It is also advantageous in this respect that it is left to the operator of the radio network to provide such an evaluation device only for specific parts of the radio network, for example, the pans having a high traffic load.

Contrary to the first embodiment in which all the data of the whole radio network are collected and evaluated collectively for the whole radio network, the amount of data to be collected in this embodiment is limited. For the evaluation of the collected data less computation and less storage capacity is necessary in this manner than for a central evaluation of the whole radio network.

In a variant of this embodiment in cases where there is a degradation of the found qualities as a result of the trial use of a radio channel, occasionally, the change of assignment to the radio channel used by way of trial is to be made nevertheless.

This enables the radio network to break away from a stable position which, however, could be only a sub-optimum.

In a form of this exemplary embodiment the determined qualities are weighted in such a way that a change of the assignment of a radio channel used by way of trial is increasingly improbable when the qualities degrade.

With this measure the functional effect of the optimization can be improved.

In a variant of this embodiment the weights of adjacent fixed stations are made equal.

In this manner an enhancement of the weighting carried out in a radio cell also leads to an enhancement of the weightings of the adjacent radio cells. As a result, an increased willingness to adapt to a changed radio situation is forced upon the directly involved adjacent station and in this manner the local willingness to adapt to a changed radio situation is increased. A fast and nevertheless locally bounded reaction is made possible in this manner.

To implement the invention, the mobile radio system can comprise one controller, or with a distributed evaluation, also a plurality of controllers, comprising means by which the data from fixed stations are collected, a channel assignment program can be drawn up, and the new channel assignment programs can be transferred to fixed stations.

A further embodiment comprises storage means in which the fixed stations that can be considered interfering stations by a specific fixed station can be stored.

In this manner only the fixed stations really to be considered interfering stations are included for the computation of a new channel list. As a result, the cost of computation of a new channel list can be reduced considerably.

In mobile radio networks one or a plurality of fixed stations comprise controllers allocated thereto, which include storage means for storing a channel list. From this channel list a radio channel is selected which is necessary for a radio connection. Furthermore, means are provided for determining the radio channel occupancies.

To implement the invention the controllers of the fixed stations can comprise means by which the collected data of the actual radio channel occupancy can be transferred, data relating to a channel list can be received and the radio channel list can be changed in response to the received data.

BRIEF DESCRIPTION OF THE DRAWINGS

The invention will now be further described and explained with reference to two preferred embodiments and the accompanying drawings, in which:

FIG. 6 shows a flow chart for a second embodiment of the invention.

DESCRIPTION OF THE PREFERRED EMBODIMENTS

In an advantageous manner a mobile radio system in accordance with the invention can also be integrated into already existing mobile radio systems. Such an existing mobile radio system is, for example, the Pan-European digital mobile radio system GSM mentioned above:

With reference to this GSM system the integration of the invention into this known mobile radio system is described by way of example.

Figure 1:
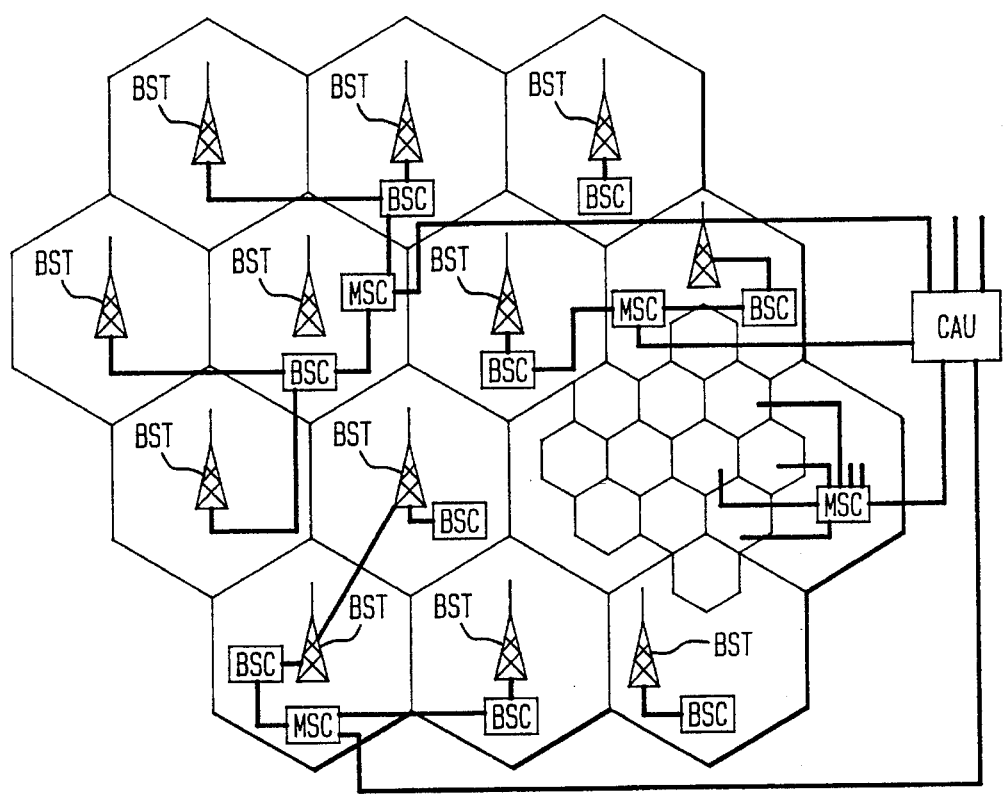
FIG. 1 shows a radio system comprising fixed stations and a central evaluation means.

In the GSM system a Base Station Transceiver BST is assigned to each radio cell. FIG. 1 shows such a radio network comprising radio cells with different diameters. One or more base station transceivers are controlled by a Base Station Controller BSC. The controllers BSC in their turn are connected to Mobile Switching Centres MSC via data lines. In these mobile switching centres the calls are linked to the public wire-bound telecommunication network.

For controlling and monitoring the network units such as, for example, the mobile switching centres, so-called Operations and Maintenance Centres (OMCs) are arranged in the GSM network. The OMC is connected to other network units via an X.25 packet switching network. Configuration data of the connected network units, thus also the radio channel lists, can be transferred from and to the OMC by means of a computer terminal. Changes of the radio channel lists carried out manually in the OMC are thus updated in the individual MSCs.

In the GSM system traffic channels containing digitally encoded speech data and various logic channels which are necessary for signalling purposes are linked to physical channels by time-division multiplexing method. However, there are also physical channels such as, for example, what is commonly referred to as BCCH (broadcast channels) which are provided only for signalling purposes.

Each base station sends out various system information signals over the BCCH. The BCCH is only necessary in the direction from the base station to the mobile station, in the what is commonly referred to as downlink. By means of the system information signals sent out over the BCCH, each mobile station located within the radio cell of the relevant base station is enabled to contact its assigned base station. In this manner the system information signals of the BCCH continue to have, for example, the frequency of a control channel Random-Access Channel RACH present only in the direction from mobile station to base station, the what is commonly referred to as uplink, over which a mobile station can demand a channel which is then made available thereto for exclusive and bidirectional use. The demanded channel is taken from a radio channel list stored in the base station and the mobile station is informed thereof over the CCCH by means of a so-called immediate assignment message. Usually, the assigned channel is first used in two directions only for data exchange as a Stand-alone Dedicated Control Channel SDCCH. If a connection for a call is established, the selected channel is used in the time-division multiplex mode as a Traffic Channel TCH and as a Slow Associated Control Channel SACCH for signalling purposes when a telephone connection is taking place.

In order to ensure undisturbed operation of a telephone connection, the GSM system has a facility to handover to a different frequency within a cell (intracell handover) and in another cell (intercell handover). For judging its radio situation, a mobile station continuously sends out measurement reports on the SACCH which reports contain measured data about its own cell and about adjacent cells.

For this purpose, the frequencies of the BCCHs of the adjacent base stations are announced on the SACCH of each one of the mobile stations. The timedivision multiplex frame of the GSM system is structured in such a way that it also contains time slots which are neither occupied by a traffic channel nor by a random access channel. In these time slots the receiver for the mobile station is tuned to the BCCHs of the adjacent base stations and measures their signal strengths.

In contrast with the traffic channels whose transmitter power is always selected to be just so large as to guarantee sufficient quality of the connection, the BCCH's are always radiated with maximum transmitter power. In this manner there is a guarantee in the first instance that each mobile station is capable of receiving the BCCH with a sufficient signal strength irrespective of the location in a radio cell. In the second instance there is an additional guarantee that the BCCH can still be measured in adjacent radio cells.

The measured signal strengths are transferred over the SACCH to the base station. Furthermore, in the GSM system the signal strength and the bit error rate of the selected channel of each mobile station are measured and also sent to the base station over the SACCH.

Figure 3:
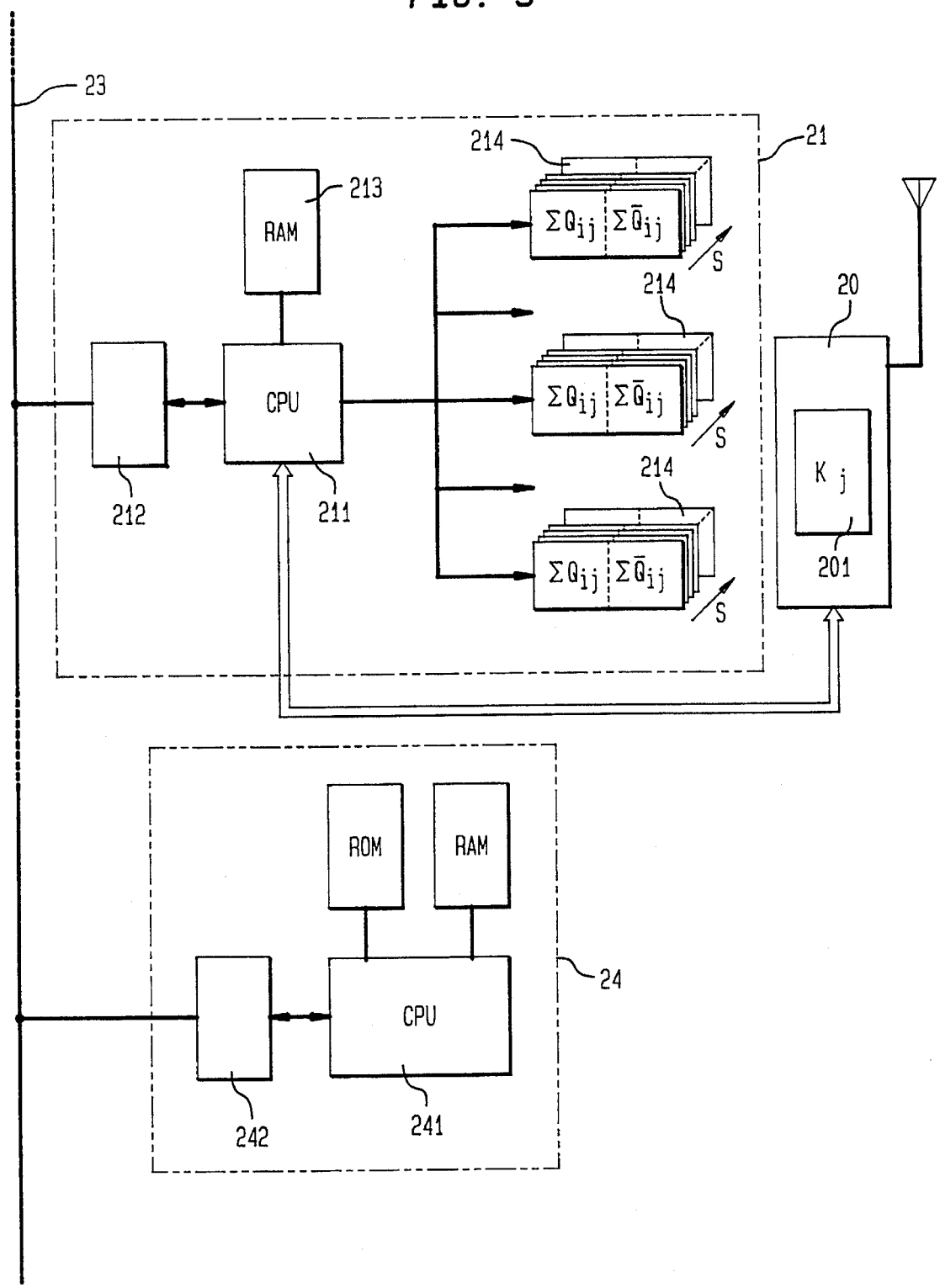
FIG. 3 shows a block diagram of an evaluation means and a fixed station for a radio system according to the invention.
Figure 4:
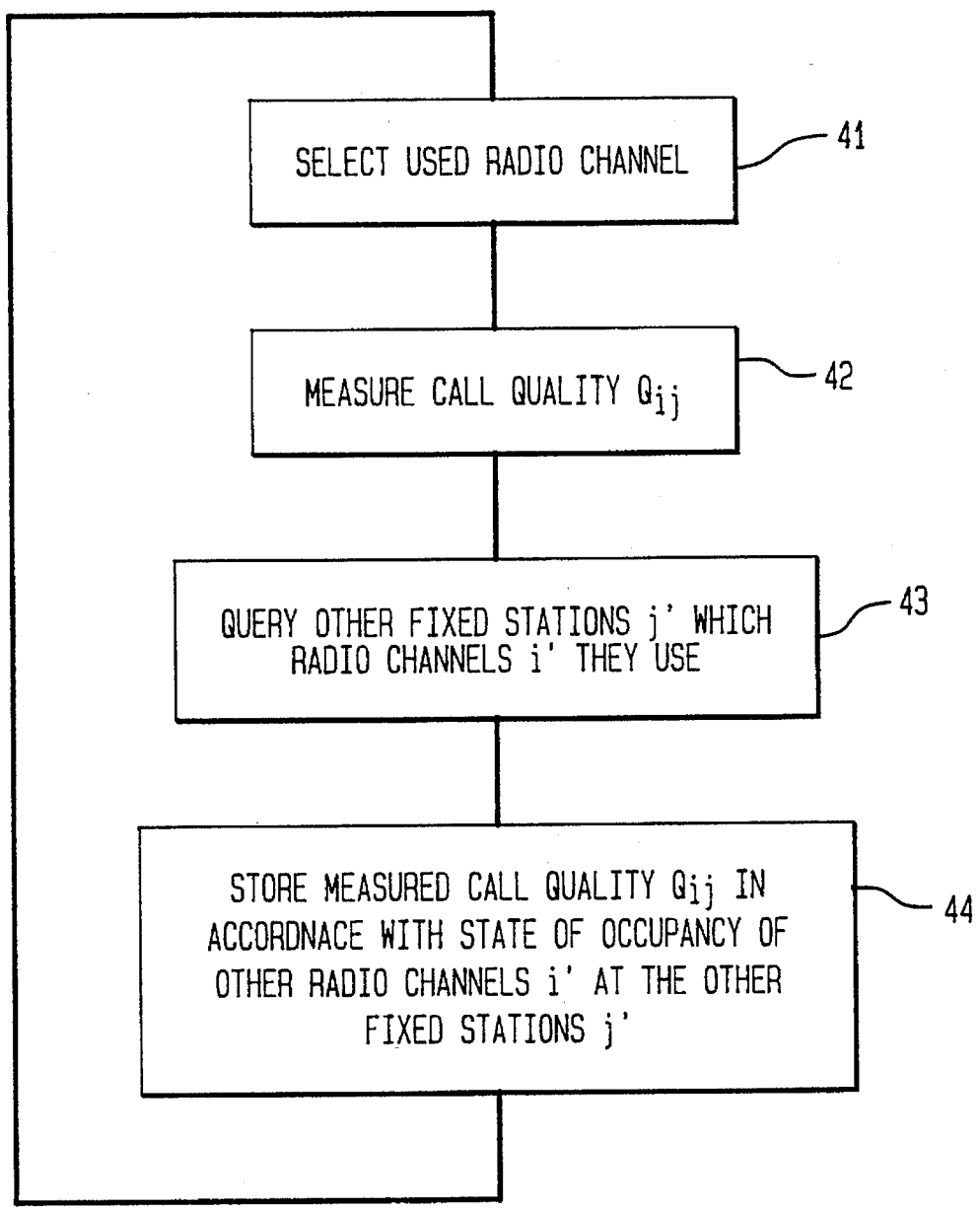
FIG. 4 shows a flow chart for an evaluation means assigned to the fixed station for the detection and ordering of call qualities.
Figure 5:
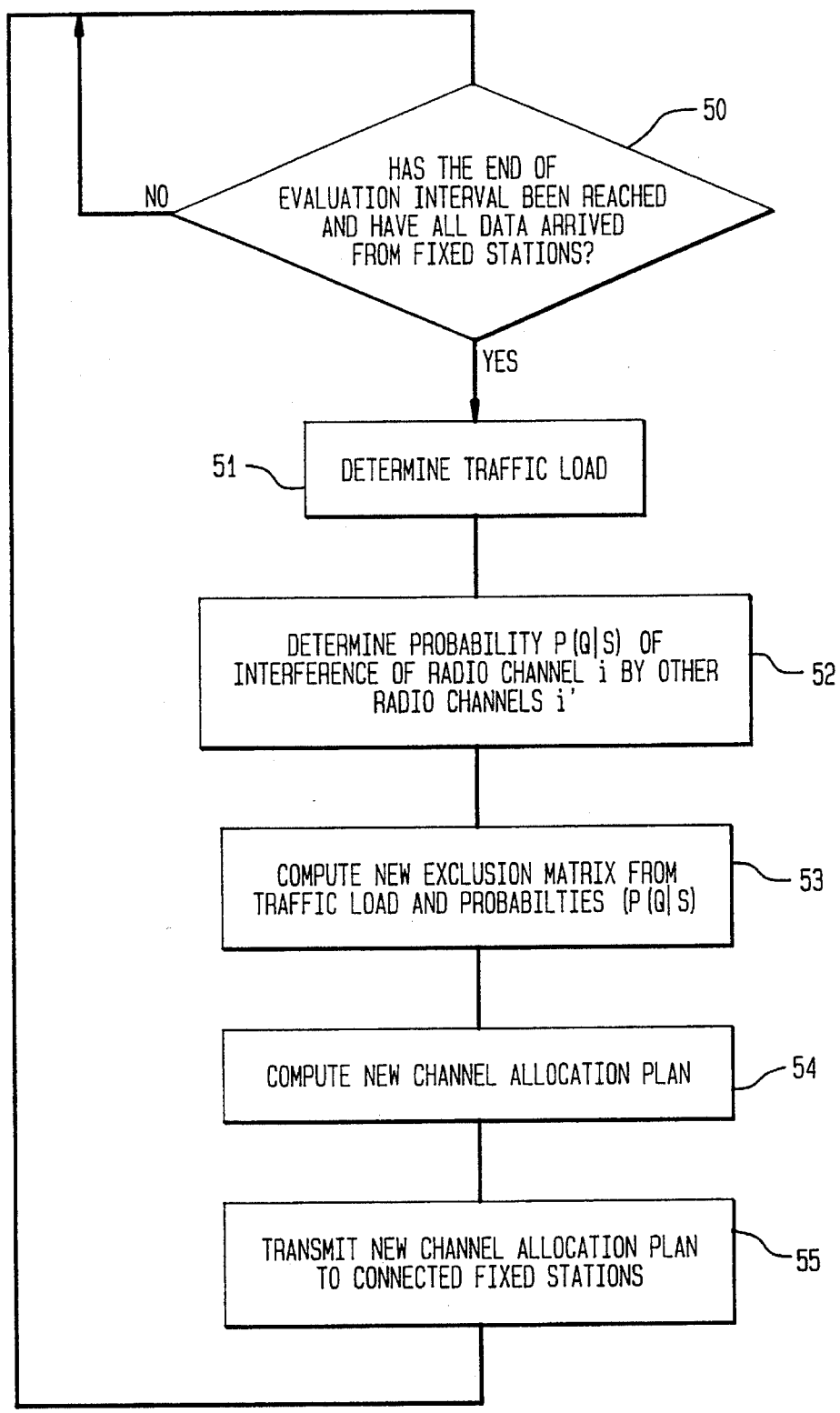
FIG. 5 shows a flow chart for an evaluation of the call qualities.

In the first embodiment of the invention to be described with reference to FIG. 3 the measured values received from the fixed stations 20 are collected and ordered in the evaluation means 21 associated with the individual fixed stations. For this purpose, each evaluation means 21 collects data about the actual traffic load in a cell and data about the call quality $q_{ij}$ of one of the radio channels i at one of the fixed stations j in dependence on the actual radio situation S, that is to say, in dependence on the fact whether that specific radio channel i, or an radio channel i' adjacent thereto in another radio cell j' is being used at that moment. To establish the actual radio situation S the evaluation means 21 associated to the fixed station concerned at the same time sends out over a data line 23 a query to the other fixed stations j' which channels i' they are using at the time.

In the event of a multiplicity of radio connections, there would be a dense data traffic among the fixed stations. The first embodiment therefore provides that at any instant there is only one radio channel i selected at each fixed station, for example, by means of a probability generator and only the speech quality thereof is measured. Over a rather long period of time enough data for a statistically reliable evaluation are nevertheless obtained.

The evaluation means 21 associated to each fixed station 20 comprises, in essence, a microcomputer 211 with associated programming. To store the measured call quality $q_{ij}$ according to the found radio situation S that precedes the measuring instant, that is, depending on which radio channels i' have been reported back as used or unused respectively, by the other fixed stations j', each fixed station j has for each radio channel i its own storage area 214. The radio situation S can be considered a vector whose elements consist of binary values. The binary "1" value features the state of occupancy of a radio channel i' at another fixed station j' as occupied, whereas a binary "0" value features the state of not occupied. Weighted addition of the vector elements i.e. the first vector element is multiplied by $2^0$, the second vector element by $2^1$, the third vector element by $2^2$ and so on, provides an unambiguous memory address for each vector.

To compress the data, a classification is made of the observed call qualities into sufficient quality. $Q_{ij}$ and insufficient quality $\bar{Q}_{ij}$. In this manner not more than two memory locations are necessary for each combination of a radio channel i selected to be measured at the fixed station j concerned and the radio channels i' reported back by the other fixed stations j' as being used. The one memory location contains the number of calls with sufficient quality $\Sigma Q_{ij}$ and the other memory location contains the number of calls with insufficient quality $\Sigma \bar{Q}_{ij}$.

At the end of an evaluation time interval the fixed stations transfer received measured values through data lines to a central evaluation means. This central evaluation means is preferably assigned to an OMC, because the data transfer devices already available for the OMC can be jointly used then. Based on its function this central evaluation means will hereinafter also be designated CAU (Channel Allocation Unit). In the central evaluation means 24 new channel lists $K_j$ for each fixed station are computed from the channel need found and the evaluated call qualities.

The central evaluation means 24 also comprises a program-controlled microcomputer 241 and an interface 242 that leads to evaluation means associated to the fixed stations. From the collected data about the traffic load of an evaluation period, the actual channel need is first determined (51) in the central evaluation means 24. For a computation of an actual exclusion matrix, the actual interference relation is determined (52) from the collected measured values in the exemplary embodiment, while the probability whether a specific radio channel i was interfered by another radio channel i' is taken into consideration.

To this end the total of all the interfering stations i(j) is determined for a given radio station j. For clarity, this embodiment takes into consideration the interfering effect of only one base station j'. Another base station j' then belongs to all the interfering stations i(j) when the following relationship of the determined probabilities P is given:

$P(Q_{ij}$ insufficient/j' uses i)>

$P(Q_{ij}$ insufficient/j' does not use i)

The determined probability $P(Q_{ij}$ insufficient) for a specific occupancy S of the radio channel i at another fixed station j' is determined from the ratio of the insufficient call qualities to the total number of call qualities considered (=sum of the insufficient and sufficient call qualities of a radio situation S determined each time):

$$P(\overline{Q_{ij}}|) = \frac{\Sigma \overline{Q_{ij}}(S)}{\Sigma Q_{ij}(S) + \Sigma \overline{Q_{ij}}(S)}$$

To reduce the data to be processed it is advantageous to decide, for example, by a comparison with a threshold value, whether the interference caused by another base station j' is significant or negligibly small. An exclusion matrix can be computed (53) by the methods known from the field of channel planning, such as, for example, the method defined hereinbefore, from the data compressed in this way. Finally, a new channel allocation plan is computed (54) from the channel need and exclusion matrix by methods also known from the field of radio network planning.

The newly established channel allocation plan comprises a new channel list $K_j$ for each fixed station, which lists are to be used from now on in lieu of the previous channel lists by the individual fixed stations. In this embodiment said interfaces further include an interface between OMC and the channel allocation unit according to the invention, via which the new channel lists can be autonomously transferred to the OMC. According to the invention the OMC is arranged in such a way that transferred channel lists automatically cause these channel lists to be conveyed through the data lines to the controllers of the fixed stations.

In this manner constantly new channel lists are produced from the network reactions. As a result, the radio network is enabled to autonomously optimize and adapt to changes in the radio network.

A more flexible channel assignment can be obtained with discrete optimization methods which allow of consideration of interference level. For this purpose the interference level is determined in a second phase for each interfering radio station j'∈I(j). Especially the interfering effect of all the other interfering stations (j"∈I (j); j"≠j') is to be filtered out. An adequate solution hereto are said determined probabilities. The sought interference level resulting from taking only a single base station into consideration is as follows:

P (j is interfered by j')

$P(Q_{ij}$ sufficient | j' uses i; all j" do not use i)
1
$P(Q_{ij}$ sufficient | j' does not use i; all j" do not use i)

Since the transmitter power of a base station in a cellular radio network is generally selected so that a sufficient coverage within the radio cell is guaranteed, but interference from further remote radio cells is avoided, it will mostly be sufficient to take only the immediately adjacent base stations into consideration as interfering stations. The omission of further remote base stations again considerably reduces the computational circuitry and cost.

The described embodiment first related to the investigation of common channel interference. Variants of the embodiment are provided by evaluations of the call quality of a radio channel i while considering that other radio channels i' (i'≠i) are used or not used respectively. As a result, also interchannel interference can be measured.

The second embodiment of the invention to be described hereinafter makes a locally bounded adaptation process of the channel lists possible. A locally bounded change of the propagation ratio leads to a locally bounded reaction in the network. Each base station j is thereto assigned storage means which contain a layout $S_j$ of all the base stations which may be considered potentially interfering stations. This list does not say that actually interfering base stations are concerned, but only that an interference by these base stations cannot reliably be excluded. Apart from purely accidentally occurring overshoot interference, only those base stations $S_j$ are considered interfering which, in dependence on their transmitter power, are located within a specific distance from the base station j. Due to this special relationship between the base station concerned and the interfering base stations that can be selected, these base stations will be referenced adjacent stations $S_j$.

The list of these adjacent stations may also be established, for example, in the planning phase, a limitation of the adjacent stations then being possible by taking the topographical and morphological data into consideration.

Figure 2:
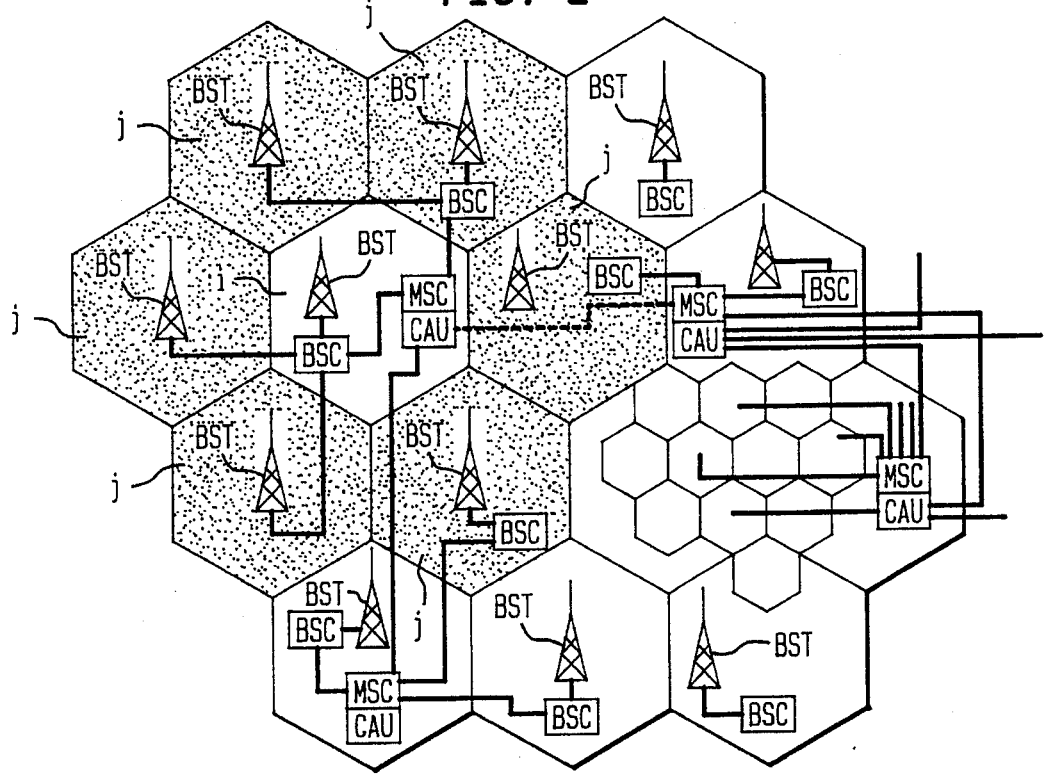
FIG. 2 shows a radio system comprising fixed stations and evaluation means for a locally bounded channel assignment.

For implementing the invention, the considered base station j and its adjacent stations $S_j$ are mutually coupled, so that an exchange of specific data to be described in detail hereinafter, between these base stations and a controller for computing new channel lists, is possible. For the essence of the invention the structure of the coupling of the base stations is not important. For example, a star-shaped coupling may be provided, which enables a central evaluation of these data, as well as a structure in which the evaluation is distributed over the adjacent stations. For simplicity, a central Channel Allocation Unit CAU is started from, as is shown in part in FIG. 2, which is connected to the mobile switching centres MSC of those base stations that are provided as adjacent stations $S_j$.

In each base station j the availability $q_{ji}$ of a radio channel i can be estimated while, for example, the count 0 denotes a continuous interference and the count 1 denotes complete availability. The availability is an estimate for the probability of the interference of a specific radio channel i sustaining to such a small extent that a switch-over to another channel will presumably not be necessary during a call. In this respect, all changes of radio channels based on a change of radio cell can be discarded here. These changes of radio channel are merely caused by the fact that a mobile station has moved from one radio cell to another and, therefore, these changes do not affect the interference situation.

The availability of the channel can be determined, for example, on the basis of an empirically determined Table in which received field strength and bit error rate are used as parameters. For example, in the GSM system there are boundaries for bit error rate and signal strength which, when exceeded, cause a change of radio channel within a radio cell to occur. For all the Table values which exceed these limit values, for example, the estimate for the availability can be set equal to the numerical value of zero.

If a channel to be investigated is not occupied at a specific instant, the received signal strength alone can be used as a substitute for an estimation of the availability.

In the following a process will be described by means of which a base station j can acquire or optimize respectively, its channel list $K_j$ on a local basis.

Preferably, the availability $q_{ji}$ should be measured over a period of time while there may be assumed that none of the marginal conditions change. Consequently, the measurement of the availability $q_{ji}$ should start again when the channel list $K_j$ of an adjacent station j' has been changed.

In order to avoid such conflicts which may occur when processes in adjacent stations happen to overlap in time, the invention provides that after a waiting period each adjacent station is sent a blocking signal (603) at the beginning of the process (601). When a blocking signal is received, the base station stops for a period of time. In this manner there is avoided that one of the adjacent stations $S_j$ itself starts a process as long as the blocking has not been cancelled.

With suitable measures there is further to be ensured that only one of the adjacent stations starts its process if blocking signals are sent out substantially simultaneously. This may be effected, for example, in that each base station that has sent out a blocking signal allows a period of time to elapse before it continues its process, in which period of time its blocking signals which had been sent by the adjacent stations $S_j$ before the blocking signal was received from the base station j, should also have arrived at the base station j. If a base station has thus discovered a conflicting situation of the blocking signals, it cancels its sent blocking signal by means of a unblocking signal and the waiting period starts anew. Since this operation is simultaneously performed by all the base stations involved in the conflicting situation, the conflict will be remedied in this manner. With a statistically, preferably exponentially distributed waiting period, there will be a non-conflicting situation with the next or one of the next blocking attempt(s).

Once the adjacent stations $S_j$ have been successfully blocked (604), the base station j selects a channel i used by it at the time and a channel i' unused by it at the time (605). This selection may be made accidentally, but also while taking into consideration which channel i has the worst availability and which channel i' has only a slight interference signal at the base station (=measuring the uplink channel).

The interference signal in the uplink can basically be measured with the receivers provided for the radio traffic at a base station. For measuring the interference signal in the uplink it is advantageous, however, to have an additional switchable receiving unit at each base station which unit searches all the unused channels and finds each time the channel i' with the smallest interference signal. This is cost effective because a receiver is cheaper for measuring an interference signal than an additional, complete mobile radio receiver unit used only for the purpose of measuring.

Over the data exchange lines all the adjacent stations j' are informed of the channels i and i' selected for the process (606). Each adjacent station j' using the channels i or adjacent channels i–n, . . . , i–1, i+1, . . . , i+n of channel i or adjacent channels i'–n, i'–1, i'+1, i'+n of the channel i' unused so far by the base station j, first measures the availabilities $q_{j'i}$ of the channel i' and its adjacent channels at the base station j' and the availability $Q_{j'i'}$ of the channel i' and its adjacent channels at a base station j' (617). Then the base station j uses henceforth by way of trial the thus far unused radio channel i' (607) for transmitting the call taking place on the radio channel i and sends a message about this change to the other fixed stations (608). All the adjacent stations that have measured the availability before the change to the unused channel i' now again measure the availability $q^*_{j'i}$ of the radio channel i used thus far and its adjacent channels at an adjacent station j' and the availability $q^*_{j'i'}$ of the radio channel i' occupied by way of trial and its adjacent channels at the base station j' (619). The measured availabilities are transmitted from the adjacent stations to the central channel allocation unit CAU of the base station j that has started the process (620). The channel allocation unit CAU of the base station j that has started the process also receives the measurement results about the availabilities $q_{ji}$ of the channel i used so far at the base station j before the channel i' was used and the availability $q^*_{ji}$ of the channel i' after it had been used by way of trial.

If, as a result of the trial use of the radio channel i', the quality of a radio connection so strongly deteriorates that an undisturbed telephone connection on the radio channel i' used by way of trial is impossible, the change in the system from one radio channel to the next within a cell ensures that the call remains unaffected.

The trial use of the radio channel may cause locally different radio conditions to occur which may entail local improvements or deteriorations compared to the radio situations so far. To estimate the local changes of the radio situation at the base station j under consideration and its assigned adjacent stations j', the sum $\Delta E$ of all the changes of availabilities is formed in the channel allocation unit CAU, which sum has resulted from the trial use of radio channel i' instead of radio channel i at the base station j and all its adjacent stations j' (610):

$$\Delta E = \sum_{j' \in S_j} \sum_{i'' \in K_{j'}} (q^*_{j'i''} - q_{j'i''}) + q^*_{ji'} - q_{ji}$$

By having the sum of all the adjacent stations j', one automatically obtains the accumulative interferences. Depending on the selection of i' , only common channel interference (i"=i and i"=i') or also adjacent channel interference (i"=i–n, . . . i–1, i, i+1, . . . , i+n and i"=i'–n, . . . i'–1, i', i'+1, . . . , i'+n) are obtained. Even if the number of cases to be considered for i" seems to be very large, in reality due to the condition that the considered channels i" should also occur in the channel list $K_j$ of the base station j, j' respectively, the number of these channels is reduced considerably. For channels not occurring in the channel list $K_j$ it is not necessary to measure their availability.

A positive sum $\Delta E$ of the changes of availabilities denotes that the trial use of the channel i' when all the adjacent station j' are considered together, has led to an improvement of the radio situation. By considering all the availabilities collectively, it is also possible that a change of the channel list is made although the availability of a channel i' at the base station j has deteriorated, but then in the case where the availability of this channel or of its adjacent channels in the adjacent stations has accordingly improved.

After the maximum measuring time has elapsed, the changes of the availabilities $\Delta E$ which have occurred as a result of the trial use of a radio channel i' not used thus far are evaluated. If there has been a deterioration, the trial use of the radio channel i' not used thus far is cancelled (612). This withdrawal is also announced to the adjacent stations, so that they can start again with old measurements of $q_{j'i}$ and $q_{j'i'}$. If, on the other hand, an improvement has occurred as a result of the trial use of the radio channel i' unused thus far, the radio channel i' thus far used by way of trial is substituted in the channel list for the radio channel i used thus far (613).

Subsequently, a signal is sent to all the adjacent stations, which signal unblocks these stations (614). As a result, these adjacent stations are again allowed to start a process for changing the channel list autonomously (601).

In the described embodiment of the invention the changes of the channel lists will increasingly diminish until a stable condition is reached. However, there cannot be excluded that this is a sub-optimum condition for which there is an even better use of the channel lists. Therefore, in a variant of the embodiment of the invention also a degradation of the channel list is allowed from time to time to make it possible in this manner to work with a sub-optimum. In order not to let the interference in the radio network become too great because of the allowed degradations, it is advantageous to allow small degradations rather than large degradations. Finally, however, even large degradations are to be allowed to work with a situation of a large sub-optimum. For this purpose, each deterioration of the sum of availabilities ΔE in the exemplary embodiment is weighted with a factor T and evaluated by means of the exponential function:

$$Y = \epsilon \frac{-\Delta E}{T}$$

The evaluated y is compared with a random number x uniformly distributed in the interval 0<x<1. Only if the value of y exceeds the random number x, i' is taken into consideration despite a degradation of the radio situation. By suitably selecting the weight factor T the frequency, with which the changes of the channel list are permitted with degradations of the radio situation, can be adjusted.

With the number or duration of the measurements also the accuracy is enhanced with which the availability $q_{ji}$ is protected. To avoid erroneous decisions based on unreliable statistical data, an estimation can be made of the variation bandwidth of the availability estimate as well as an estimation of a top and bottom boundary for the availability, within which the real value of the availability is most probably situated. If the bottom estimate is used for computing the ΔE, one is on the safe side with this computation and avoids a change of the channel list as a result of statistically unreliable data.

In a further embodiment of the invention there is provided to change the weight factor. Starting from a maximum weight factor $T_{max}$, the weight factor T is reduced, for example, after a specific number of channel changes and/or after a specific period of time has elapsed. In the beginning changes of the channel list due to deteriorations are relatively often permitted in this manner. This is especially highly suitable in radio networks which come into operation. With radio networks coming into operation the traffic load is generally relatively small and the radio network is not loaded to capacity yet. Frequently changing the channel lists can therefore be easily handled by a radio network that has just come into operation. With an increasing traffic load and an expanding radio network the number of channel list changes are automatically reduced. By predetermining a specific number of final values $T_{end}$ for the weight factor T there is ensured that leaving a sub-optimum condition remains possible in principle.

On the assumption that the marginal conditions are constant, an optimum condition is found in this manner. A real radio network, however, is constantly subjected to changes. For example, due to the erection of new buildings the propagation conditions are changed; new base stations can be added. In response to an increased demand on a base station, new transceiving stations are installed which make a larger number of available radio channels possible. If the whole process were started anew with the maximum weight factor $T_{max}$ in such cases, this would first lead to a considerable deterioration of the quality of the radio system.

In a further embodiment of the invention there is provided that the weight factor T used at the base station is partly formed from the weight factor used so far for this base station and from the weight factors of all the other adjacent stations. It has appeared, for example, that a unilateral increase by itself of a weight factor T at the base station j to adapt this base station to changed conditions is not sufficient, because adaptations of the adjacent stations j', when their weight factors $T_j$ remain unchanged, are allowed only to a proportionally small extent. With an adjustment of the weight factors, effected at regular intervals, the willingness to change is temporarily increased around a changed radio environment. In this respect it may be advantageous to keep the weight factor $T_j$ of a base station for which there is a need for extraordinary adjustment, at the maximum value $T_{max}$ for a rather long period of time.

If, for example, the radio situation changes because a new base station has been included in the system, the weight factor of the new base station is set to the maximum value $T_{max}$ when taken into operation and, at the same time, the newly operated base station is included in the adjacent station list $S_j$ of the adjacent radio cells. As a result of the adjustment of the weight factor, the weight factors of the adjacent base stations are temporarily increased when a new base station comes into operation, and thus there is a provocation to leave the optimum condition found so far.

A change of the radio situation, however, can also be detected by the radio system itself in that, for example, the estimates for the availability $q_{ji}$ are considered. If the estimate of the availability $q_{ji}$ is changed, without a trial change of a radio channel taking place in the neighbourhood of a base station, this denotes a change of the radio situation. This makes it possible to react especially to changes of the radio situation which were not caused by the network user and thus take place without his knowledge. For example, due to the erection of a flat building entirely new interference situations may arise which may be the cause for deteriorations but also improvements of the radio situation.

For computing a new weight factor $T^*_j$ at the base station j the channel allocation unit CAU comprises, for example, the following formula to be used:

$$T_j^* = pT_j + (1-p) \frac{1}{|S_j|} \sum_{j' \in S_j} T_{j'}$$

A newly computed weight factor is then formed by a specific part p of the prior weight factor $T_j$ and a part (1-p) of the mean value of the weight factors of its adjacent stations. Naturally, the part p is to be selected between 0 and 1. Depending on the period of time the weight factor $T_j$ of a base station j, whose radio situation has changed, is kept at an increased value, the more the change of this weight factor in the whole network has its influence and thus makes it possible to adapt the whole radio network. Since the propagation of the modified weight factors $T^*$ slowly increases, however, there is ensured that a local change of the radio situation mainly has local influences and does not abruptly upset the more or less stable condition of the whole radio network.

In further embodiments of the invention a plurality of different channel lists are provided which are selected in response to specific results. For example, when including the time of the clock in this selection of a channel list, the process for optimization of the channel list can be started at different times of the day. Since also the traffic load varies during the day, one thus obtains the channel lists adapted to the traffic load of the time of flay.

When the data is included, adaptations to specific seasons may also be made.

We claim:

1. A method of operation of a cellular radio system having a plurality of fixed stations and a plurality of mobile stations, each fixed station being in a respective regional cell of said system and providing communication with mobile stations in said cell over radio channels selected from a channel list assigned to said fixed station, respective channel lists being assigned to the respective fixed stations; said method comprising the steps of:

(a) over an extended time period of operation of said system, accumulating in each fixed station and for each channel assigned thereto data relating to (i) evaluation whether said channel is of acceptable quality with respect to a predetermined quality threshold, and (ii) evaluation whether there is a correlation between the quality of said channel and states of occupancy of channels assigned to other fixed stations in said system;

(b) based on the data accumulated in step (a) from all fixed stations, formulating optimum channel assignments for each of said fixed stations; the optimum channel assignments being those which will maximize the number of channels in said system which are of acceptable quality;

(c) supplying lists of the optimum channel assignments to said fixed stations to replace then existing channel comprising the steps of:

(d) a fixed station (j), instead of using a channel (i) assigned thereto uses by way of trial a substitute channel (i') that is not assigned thereto, resulting in changes in quality of the channels (i, i') at the fixed station (j) and at one or more adjacent fixed stations (j'); and (e) said changes in channel quality are evaluated and if found to be improvements the trial radio channel (i') is substituted for the assigned channel (i).

2. A method as claimed in claim 1, wherein evaluation of quality of a channel includes an estimate of availability of said channel.

3. A method as claimed in claim 1, wherein after a change in the channel assignments of a fixed station a plurality of the other fixed stations signify whether said change has affected the quality of any of the channels assigned to said other fixed stations.

4. A method as claimed in claim 1, wherein when the quality of a channel assigned to a fixed station significantly changes an inquiry is made to determine whether the states of occupancy of channels assigned to other fixed stations have changed.

5. A method as claimed in claim 1, wherein in certain instances the trial channel (i') is substituted for the assigned channel (i) even when such substitution is found to result in reduction of channel quality.

6. A method as claimed in claim 5, wherein the evaluation of changes in channel quality is weighted in such a way that substitution of trial channel (i') for assigned channel (i) in said instances is increasingly less probable as the reduction of channel quality increases.

7. A method as claimed in claim 6, wherein equal weightings are given to the channel qualities of channels assigned to fixed stations (j') which are adjacent to each other.

8. A cellular radio system having a plurality of fixed stations and a plurality of mobile stations, each fixed station being in a respective regional cell of said system and providing communication with mobile stations in said cell over radio channels selected from a channel list assigned to said fixed station, respective channel lists being assigned to the respective fixed stations; said system comprising:

means for accumulating over an extended time period of operation of said system data from each fixed station and for each channel assigned thereto relating to (i) evaluation whether said channel is of acceptable quality with respect to a predetermined quality threshold, and (ii) whether there is a correlation between the quality of said channel and states of occupancy of channels assigned to other fixed stations in said system;

means for collecting the accumulated data from all fixed stations and based thereon formulating optimum channel assignments for each of said fixed stations, the optimum channel assignments being those which will maximize the number of channels in said system of acceptable quality;

means for supplying lists of the optimum channel assignments to said fixed stations as replacements for then existing channel assignments;

means for testing at a fixed station (j), instead of using a channel (i) assigned thereto using by way of trial a substitute channel (i') that is not assigned thereto, resulting in changes in quality of the channels (i, i') at fixed station (j) and at one or more adjacent fixed stations (j'); and means for evaluating said changes in channel quality and, if said changes are found to be improvements, substituting the trial radio channel (i') for the assigned channel (i).

\* \* \* \* \*